United States Patent
Hirst et al.

(10) Patent No.: US 11,321,030 B2
(45) Date of Patent: May 3, 2022

(54) VERIFICATION OF AUTHENTICITY OF REPLACEABLE PRINTER COMPONENTS AND DISABLE ACCESS TO A FEATURE BASED ON OPERATION IS NOT PERFORMED BY HOST

(71) Applicant: Hewlett-Packard Development Company, L.P., Spring, TX (US)

(72) Inventors: Bartley Mark Hirst, Boise, ID (US); James Michael Magdich, Boise, ID (US); Paul L. Jeran, Boise, ID (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/962,271

(22) PCT Filed: Jan. 30, 2018

(86) PCT No.: PCT/US2018/015943
§ 371 (c)(1),
(2) Date: Jul. 15, 2020

(87) PCT Pub. No.: WO2019/151987
PCT Pub. Date: Aug. 8, 2019

(65) Prior Publication Data
US 2021/0064312 A1 Mar. 4, 2021

(51) Int. Cl.
*G06F 3/12* (2006.01)
*G06F 21/60* (2013.01)
(Continued)

(52) U.S. Cl.
CPC ............ *G06F 3/1238* (2013.01); *G06F 3/121* (2013.01); *G06F 3/1222* (2013.01); *G06F 3/1234* (2013.01); *G06F 21/608* (2013.01);

*H04L 9/0894* (2013.01); *G03G 15/553* (2013.01); *G03G 2215/00548* (2013.01);
(Continued)

(58) Field of Classification Search
None
See application file for complete search history.

(56) References Cited

U.S. PATENT DOCUMENTS 6,385,407 B1   5/2002   Inose
6,547,364 B2   4/2003   Silverbrook
(Continued)

FOREIGN PATENT DOCUMENTS

JP   2007-76302 A   3/2007
WO   WO-2010/106537 A2   9/2010
WO   WO-2012/174169 A2   12/2012

OTHER PUBLICATIONS

Falk, S. et al., Protecting Remote Component Authentication, 2011, https://www.researchgate.net/profile/Rainer_Falk/publication/266344347_Advances_in_Protecting_Remote_Component_Authentication/links/551ciee40cf2febcbf7678d.ndf.

*Primary Examiner* — Haris Sabah
(74) *Attorney, Agent, or Firm* — Jefferson IP Law, LLP

(57) ABSTRACT

An example replaceable printer component includes a communication engine. The communication engine indicates to a host an operation to be performed by the host. The replaceable printer component also includes a sensor engine to measure a property affected by the operation. The replaceable printer component includes a verification engine to determine whether the host performed the operation based on the measurement of the property.

19 Claims, 6 Drawing Sheets

(51) Int. Cl.
*H04L 9/08* (2006.01)
*G06Q 30/00* (2012.01)
*G03G 15/00* (2006.01)

(52) U.S. Cl.
CPC ......... *G06F 3/1229* (2013.01); *G06Q 30/012* (2013.01); *G06Q 30/0185* (2013.01)

(56) References Cited

U.S. PATENT DOCUMENTS

| | | | |
|---|---|---|---|
| 7,267,421 | B2 | 9/2007 | Asauchi et al. |
| 7,325,052 | B1 | 1/2008 | Motoyama |
| 7,643,948 | B2 | 1/2010 | Balinsky et al. |
| 7,831,156 | B2 * | 11/2010 | Igarashi ................ G03G 15/55 399/24 |
| 2004/0001722 | A1 * | 1/2004 | Nezu ...................... G03G 15/55 399/27 |
| 2004/0181681 | A1 | 9/2004 | Salisbury |
| 2005/0264597 | A1 * | 12/2005 | Asauchi ............... B41J 2/17546 347/19 |
| 2011/0010770 | A1 | 1/2011 | Smith et al. |
| 2012/0317662 | A1 | 12/2012 | Neo et al. |
| 2013/0322895 | A1 * | 12/2013 | Katayama .......... G03G 15/2017 399/24 |
| 2016/0378584 | A1 * | 12/2016 | Oku ...................... G06F 11/079 358/1.14 |
| 2017/0346800 | A1 | 11/2017 | Katoh |

\* cited by examiner

```
Receive a Request from a Host for an Indication of an
Operation to Be Performed
402
            │
            ▼
At Least Pseudorandomly Select an Operation to Be
Performed
404
            │
            ▼
Indicate to the Host the Operation to Be Performed
406
            │
            ▼
Measure a Physical Property Affected by an Operation
Performed by a Host
408
            │
            ▼
Determine the Host Did Not Perform the Operation
Based on the Measurement of the Physical Property
410
            │
            ▼
Store an Indication the Host Did Not Perform the
Operation
412
            │
            ▼
Receive a Proper Request to Access a Feature from the
Host
414
            │
            ▼
Decide Based on the Stored Indication Not to Provide
Access to the Feature in Response to the Request
416
```

VERIFICATION OF AUTHENTICITY OF REPLACEABLE PRINTER COMPONENTS AND DISABLE ACCESS TO A FEATURE BASED ON OPERATION IS NOT PERFORMED BY HOST

BACKGROUND

In many printers, power, toner, ink, printing liquids, three-dimensional print agents, or other printing materials may be contained in removable cartridges. The printer may generate a print product by delivering the print material from the removable cartridge to a print target. As the printer generates print products, the printing material may be consumed. Replaceable printer components, such as those containing printing materials, may be replaced periodically, for example, when the printing material is fully consumed.

BRIEF DESCRIPTION OF THE DRAWINGS

FIG. 4 is a flow diagram of another example method to verify authenticity of a host.

DETAILED DESCRIPTION

Proper functioning of a replaceable printer component or the printer may depend on the authenticity of the replaceable printer component. For example, the replaceable printer component may include settings to be used by the printer. The printer may be damaged if the replaceable printer component provides improper settings. The improper settings may also, or instead, cause the replaceable printer component to be rendered unusable before full consumption of the replaceable printer components. In addition, a warranty of the printer may be affected by whether an authentic replaceable printer component is used with the printer. Accordingly, the replaceable printer component may store information that can be used by the printer to verify the authenticity of the replaceable printer component. The printer may determine whether the replaceable printer component is an authorized product that will provide appropriate settings.

Counterfeit replaceable printer components may be produced by attacking authentic replaceable printer components to extract the authentication information stored by the authentic replaceable printer components. For example, the authentication information may be extracted from the authentic replaceable printer component and stored in counterfeit replaceable printer components with settings information that may be inappropriate for the counterfeit replaceable printer component. When the counterfeit replaceable printer component is installed in a printer, the printer may receive authentication information that causes the printer to believe the replaceable printer component is authentic, but the settings may nonetheless cause damage to the printer.

The authentication information may be extracted from the replaceable printer component by communicatively coupling the replaceable printer component with a computing device (e.g., a microcontroller, a special purpose integrated circuit, or the like). The computing device may read the authentication information from the replaceable printing component or may read information usable to determine the authentication information. In an example, the computing device may establish an encrypted communication session with the replaceable printer component and may derive the authentication information based on the encrypted communication session. The risk of damage from counterfeit replaceable printer components may be reduced by making it more difficult for computing devices to extract authentication information from replaceable printer components.

Figure 1:
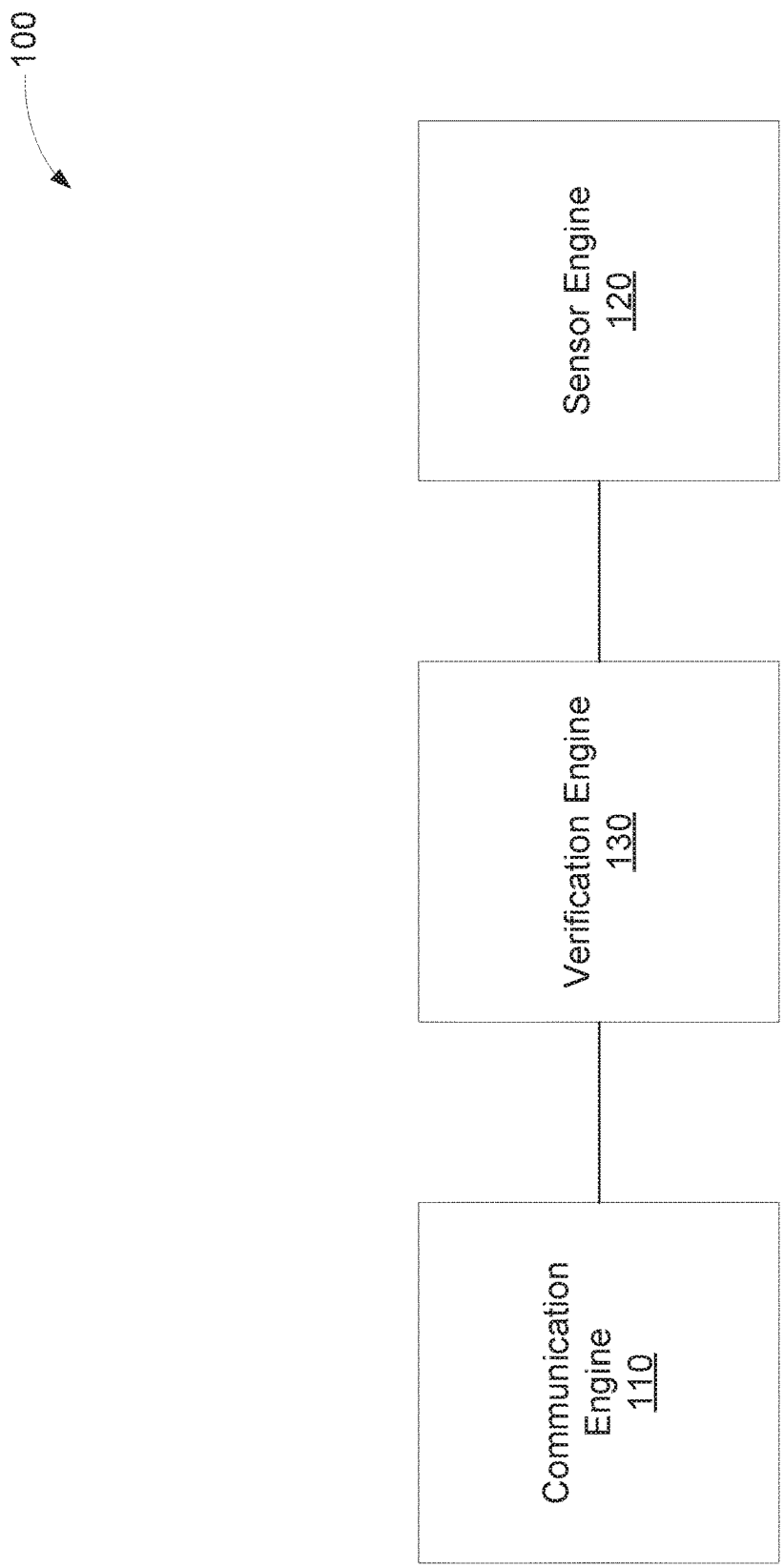
FIG. 1 is a block diagram of an example replaceable printer component to verify authenticity of a host.

FIG. 1 is a block diagram of an example replaceable printer component 100 to verify authenticity of a host. The replaceable printer component 100 may include a communication engine 110. As used herein, the term "engine" refers to hardware (e.g., a processor, such as an integrated circuit or other circuitry, analog circuitry, materials to sense physical properties, etc.) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware. The communication engine 110 may indicate to a host an operation to be performed by the host. For example, the replaceable printer component may be installable into the host, and the communication engine 110 may be able to communicate with the host when the replaceable printer component is installed in the host. The communication engine 110 may transmit a signal to the host that encodes information indicative of an operation that the host is to perform.

The replaceable printer component 100 may include a sensor engine 120. The sensor engine 120 may measure a property affected by the operation. For example, the host may modify the physical environment when performing the operation. The sensor engine 120 may measure the property to detect the modification to the physical environment caused by the operation.

The replaceable printer component 100 may include a verification engine 130. The verification engine 130 may determine whether the host performed the operation based on the measurement of the property. The verification engine 130 may receive the measurement of the property from the sensor engine 120. The value of the measurement of the property may vary depending on whether or not the host has performed the operation. Accordingly, the verification engine 130 may determine whether the value indicates that the host did or did not perform the operation. In an example, the verification engine 130 may compare the measurement of the property to a threshold to determine whether the measurement indicates the operation was performed.

Figure 2:
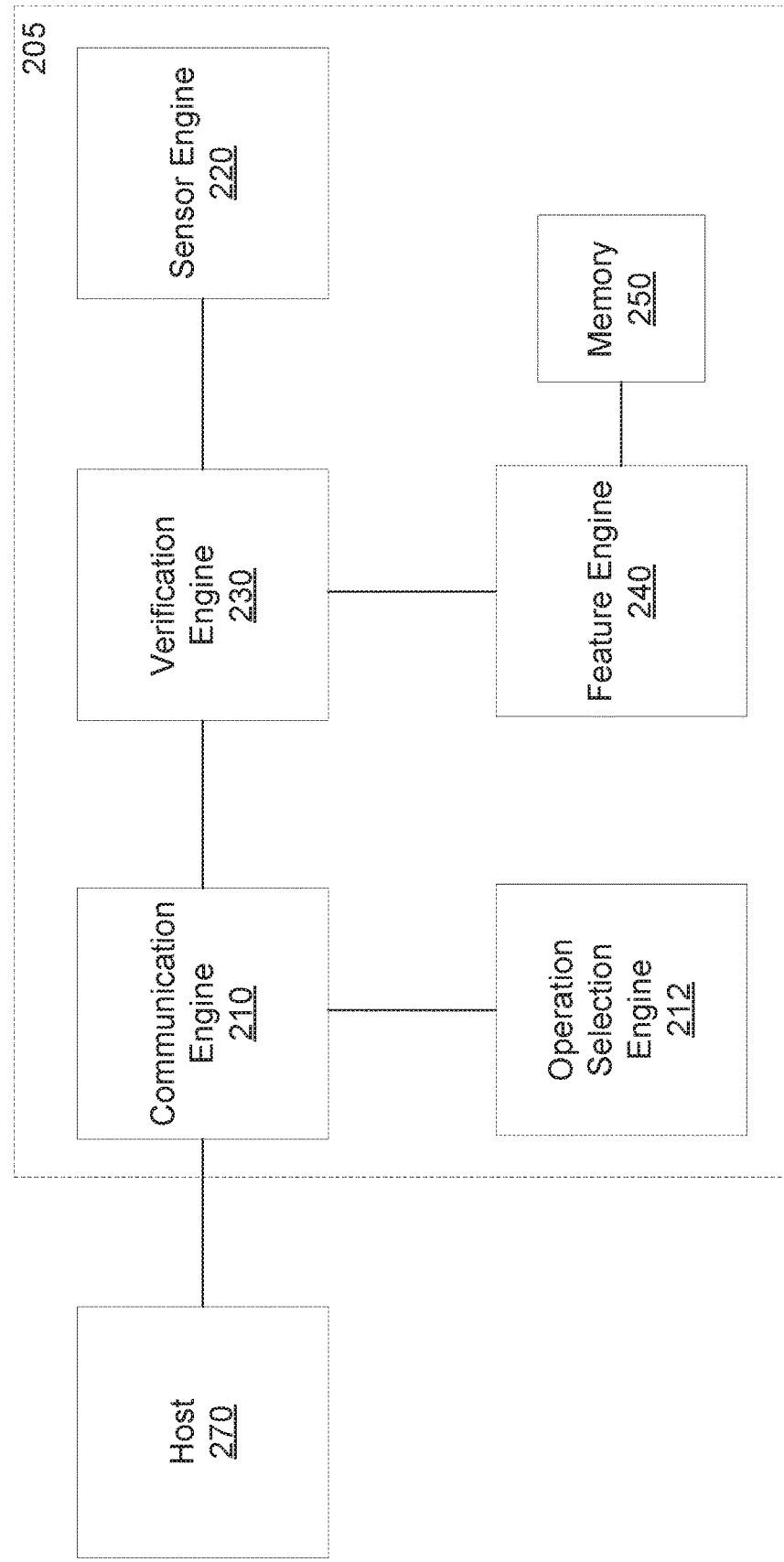
FIG. 2 is a block diagram of an environment containing another example replaceable printer component to verify authenticity of a host.

FIG. 2 is a block diagram of an environment 200 containing another example replaceable printer component 205 to verify authenticity of a host 270. The replaceable printer component 205 may include an operation selection engine 212. In some examples, the operation selection engine 212 may select a first plurality of operations to be performed by the host 270. For example, the operation selection engine 212 may select a sequence of operations to be performed by the host 270. The operation selection engine 212 may select timing of the sequence of operations, such as a length of time of each operation, a delay between operations, etc. The operation selection engine 212 may select the sequence of operations or the time of the sequence of operations at least pseudorandomly. As used herein, the phrase "at least pseudorandomly" refers to an action performed based on the results of a pseudorandom or random process. For example, the operation selection engine 212 may select the sequence of operations based on the output of a pseudorandom or truly random number generator. In an example, the operation selection engine 212 may select a single operation, e.g., at least pseudorandomly, rather than a sequence of operations.

The replaceable printer component 205 may include a communication engine 210. The communication engine 210 may indicate to a host 270 the operation or sequence of operations to be performed the host 270. In an example, the host 270 may include a printer. The host 270 may also, or instead, include any other device connected to the replaceable printer component 205 to communicate with the replaceable printer component 205. In an example, the host 270 may include a lookup table containing predetermined operations or sequences of operations, and the communication engine 210 may indicate the operation or sequence of operations to be performed by transmitting an index or address for the lookup table to the host 270. Alternatively, or in addition, the communication engine 210 may transmit an indication of each operation to be performed, an indication of a time for each operation to be performed, an indication of each delay between operations, or the like. The host 270 may prompt the communication engine 210 to provide the indication of the operation or sequence of operations, or the communication engine 210 may transmit the indication to the host 270 without prompting.

The host 270 may perform the operations indicated by the communication engine 210. For example, the host 270 may perform the operations according to the order, timing, delays, and other parameters and settings specified by the communication engine 210. In some examples, the host 270 may also select a sequence of operations to be performed by the host 270, which may include selecting the order, timing, delays, and other parameters and settings for those operations. For example, the operation selection engine 212 may select a first plurality of operations that are communicated to the host 270 by the communication engine 210, and the host 270 may select a second plurality of operations. The host 270 may perform the first and second operations. In an example, the host 270 may select the operations to be verified by the replaceable printer component 205, and the host may communicate the selected operations to the communication engine 210.

Various operations may be performed by the host 270. For example, the host 270 may modify an electrical property of a signal transmitted from the host 270 to the replaceable printer component 205. The electrical property may be a voltage (e.g., a voltage supply level, voltage levels used for digital communication, etc.), a frequency (e.g., a frequency of a clock used in communications, etc.), a current, a resistance, an impedance, or the like. The operation selection engine 212 may determine the magnitude of the modification for operations selected by the operation selection engine 212. The operation selection engine 212 may select from predetermined magnitudes or may select from a range of magnitudes. For example, each entry in the lookup table may have predetermined magnitudes for the operation or sequence of operations in that entry. Similarly, the host 270 may determine the magnitude of the modification for operations selected by the host 270. In some examples, the host 270 may operate a component of the printer, such as a fan, a fuser, a drum, a roller, a belt, a scanner, or the like. The host 270 may operate the component at a full speed, power, temperature, etc. or at a higher or lower speed, power, temperature, etc. Whichever of the operation selection engine 212 and the host 270 selected the operation may select the parameters for performing that operation. In an example, a sequence of operations may include doubling a signal frequency for two seconds, delaying one second, decreasing a voltage 30% for one second, delaying zero seconds, operating a fan at 50% speed for two seconds, delaying three seconds, and turning on a fuser at full power for five seconds.

The replaceable printer component 205 may include a sensor engine 220. The sensor engine 220 may measure a property affected by the operation. For example, the sensor engine 220 may measure an electrical property to detect a modification of that electrical property. The sensor engine 220 may include an analog-to-digital converter, a voltage divider, or the like to measure the electrical property. In an example, the sensor engine 220 may include a crystal oscillator, and the sensor engine 220 may determine the frequency of a received signal by counting the number of cycles received over a time period determined using the crystal oscillator. In some examples, the sensor engine 220 may measure a motion property, a vibration property, a temperature property, or the like. The sensor engine 220 may include an accelerometer or a transducer to measure a vibration or movement property. The sensor engine 220 may include a thermal sensor to measure the temperature property. Referring to the example sequence of operations referenced above, the sensor engine 220 may detect the change in frequency and measure the magnitude and length of time of the frequency change, measure the time of the delay, detect the change in voltage and measure the magnitude and length of time of voltage change, measure the delay, detect the vibrations from the fan and measure the speed and length of time of the fan operation, measure the delay, and detect the temperature change of the fuser and measure the magnitude and length of time of the temperature change.

The replaceable printer component 205 may include a verification engine 230. The verification engine 230 may determine whether the host 270 performed the operation or sequence of operations based on the measurement of the property. For example, the verification engine 230 may compare indicated operation or sequence of operations to the measurements from the sensor engine 220 to determine whether the measurements correspond to the indicated operation or sequence of operations. In some examples, the verification engine 230 may convert the measurement to a ratio. For example, the verification engine 230 may determine a ratio of an electrical property measured before or after the operation to that same electrical property measured during the operation. The verification engine 230 may determine whether the ratio is within a predetermined range of the ratio that should have resulted from the operation specified by the operation selection engine (e.g., by comparing the ratio to upper and lower thresholds for the range). Similarly, the verification engine 230 may determine ratios for the motion, vibration, or temperature properties by comparing a default operation (e.g., an operation performed at a default speed or power, an operation that produces a default temperature, such as a fuser being off, etc.) to an indicated operation. The verification engine 230 may determine the host 270 has performed the sequence of operations correctly when every measurement is correct, all but one measurement is correct, 75% of measurements are correct, etc. The tolerance of the verification engine 230 may be controlled based on the ranges of acceptable measurements, the number of correct measurements to successfully verify the host, combinations of range limits and number of correct measurements, or the like. In an example, the verification engine 230 may automatically retry verification in response to the host 270 not performing the operation or sequence of operations correctly. For example, the communication engine 210 may indicate a new operation or sequence of operations, and the sensor engine 220 and the verification engine 230 may verify whether the host 270 performed the new operation or sequence of operations. A predetermined number of retries may be performed.

The replaceable printer component 205 may include a feature engine 240. The feature engine 240 may determine features to make available based on whether the host 270 performed the operation or sequence of operations. For example, the feature engine 240 may determine that a full (or fuller) set of features should be made available based on the verification engine 230 determining that the host 270 performed the correct operation or sequence of operations. In contrast, if the verification engine 230 determine that the host 270 did not perform the correct operation or sequence of operations, the feature engine 240 may limit the features made available. In an example, the replaceable printer component 205 may include a memory 250 that stores security data, such as a key. The feature engine 240 may disable encrypted communication or all uses of the security data or key based on a determination the host 270 did not perform the correct operation or sequence of operations. In some examples, the feature engine 240 may temporarily or permanently disable encrypted communication based on the verification engine 230 determining the host has failed to perform the correct operation or sequence of operations a predetermined number of times (e.g., a predetermined number of failures in a row without a successful verification). Thus, the replaceable printer component 205 may prevent an attacker from extracting the security data or the key.

In some examples, the feature engine 240 may delete the security data, such as the key, to prevent access to the security data, or the feature engine 240 may temporarily or permanently disable the replaceable printer component 205. For example, the feature engine 240 may disable the communication engine 210 temporarily to prevent any use of the replaceable printer component 205 until the replaceable printer component 205 has been reset and the host 270 has been verified. In an example, the feature engine 240 may delete data, burn a fuse or antifuse, or take other action to completely and permanently render the replaceable printer component 205 unusable. The feature engine 240 may take different actions depending on the number of verifications or number of consecutive verifications failed (e.g., increasingly drastic actions for more failures).

In some examples, the feature engine 240 may limit features that could cause damage to the host 270 if not so limited. For example, the feature engine 240 may limit a temperature, power, speed, etc. setting that could damage the host 270. The feature engine 240 may reduce the number or range of values available for a printer setting. In some examples, the feature engine 240 may preclude usage of a highest setting, permit use of no more than a lowest setting, permit use of a predetermined number of settings, permit use of settings up to a predetermined percentage of a highest setting, or the like. The feature engine 240 may disable access to the features by storing an indication that the host did not perform the operation or sequence of operations correctly or by storing indications of the features available for use. When a proper request to access a feature is received, the feature engine 240 may check the stored indication and decide based on the stored indication whether or not to provide access to the feature in response to the request. Thus, the feature engine 240 may prevent an unverified host 270 from using settings that may cause damage to the host 270 or the replaceable printer component 205.

In some examples, the host 270 may determine whether the replaceable printer component 205 is authentic based on the second plurality of operations selected by the host 270. For example, the verification engine 230 may determine the second plurality of operations based on the measurements by the sensor engine 220. The communication engine 210 may indicate the second plurality of operations to the host 270. The communication engine 210 may indicate an entry in a lookup table corresponding to the second plurality of operations or may individually indicate each operation in the sequence. The host 270 may determine whether the indication of the second plurality of operations is correct and may determine which features of the replaceable printer component 205 to use or whether to use the replaceable printer component 205 at all based on whether the indication is correct. Thus, the replaceable printer component 205 and the host 270 may mutually verify the authenticity of each other prior to beginning full operation.

Figure 3:
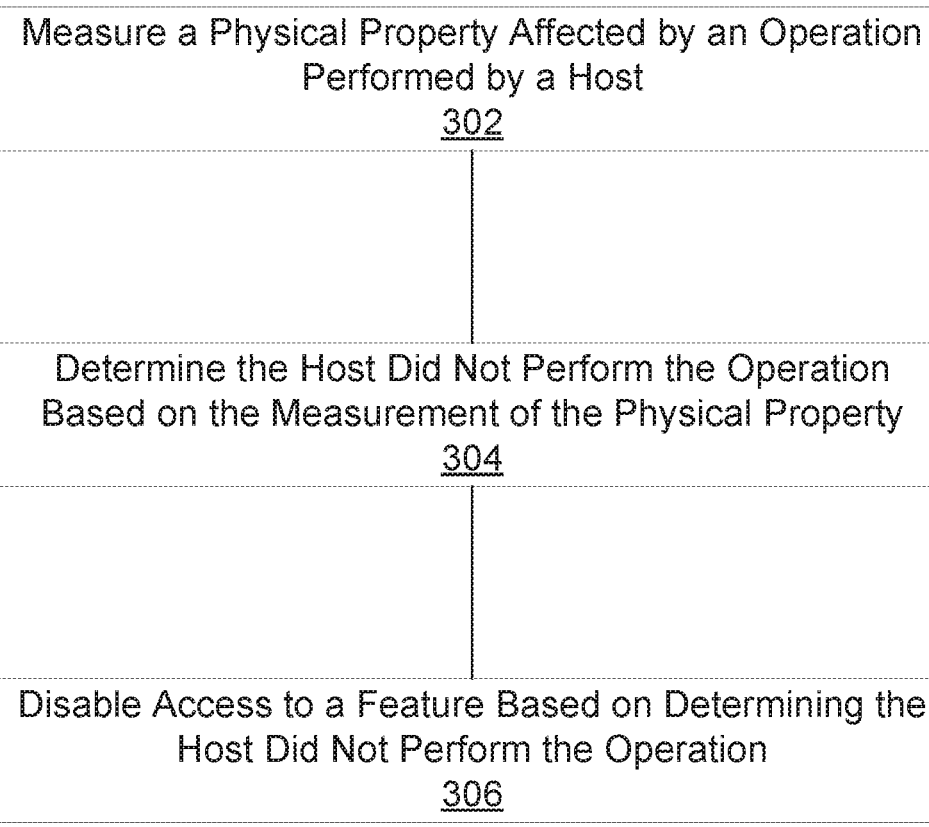
FIG. 3 is a flow diagram of an example method to verify authenticity of a host.

FIG. 3 is a flow diagram of an example method 300 to verify authenticity of a host. A processor may perform the method 300. At block 302, the method 300 may include measuring a physical property affected by an operation performed by a host. For example, the host may perform an operation that affects the physical environment of the host. Measuring the physical property may include measuring any of the physical properties of the physical environment of the host that are affected by the operation performed by the host.

At block 304, the method 300 may include determining the host did not perform the operation based on the measurement of the physical property. For example, determining the host did not perform the operation may include comparing the measurement directly or indirectly to a threshold to determine whether the measurement does not satisfy the threshold or is not within a range of acceptable values. In some examples, determining the host did not perform the operation may include determining the host did not perform the operation with the proper settings. For example, the host may not have performed the operation at the correct speed, power, temperature, etc., may not have performed the operation at the correct time, may not have performed the operation for the correct length of time, or the like.

Block 306 may include disabling access to a feature based on determining the host did not perform the operation. Disabling access to the feature may include temporarily or permanently disabling access to a predetermined feature. For example, access to the feature may be temporarily disabled until the host or, e.g., the replaceable printer component is power cycled, permanently disabled until the replaceable printer component is installed in a new host, permanently disabled forever regardless of any additional actions taken, or the like. In an example, access to the feature may be temporarily disabled until the host has failed to perform the operation a predetermined number of times, at which point access to the feature may be permanently disabled. For example, a counter may be incremented each time the host or the replaceable printer component is power cycled and the host fails to perform the indicated operation. The counter may be compared to the predetermined number to determine whether to temporarily or permanently disable access to the feature. Disabling access to the feature may include limiting the parameters or settings available to the host. In some examples, disabling access to the feature may include disabling access to all features. Referring to FIG. 2, in an example, the sensor engine 220 may measure the physical property, the verification engine 230 may determine the host did not perform the operation, and the feature engine 240 may disable access to the feature.

FIG. 4 is a flow diagram of another example method 400 to verify authenticity of a host. A processor may perform the method 400. At block 402, the method 400 may include receiving a request from a host for an indication of an operation or sequence of operations to be performed. For example, the host may boot and may reach a state in which it is ready to be verified. Accordingly, the host may indicate that it is ready to be verified by requesting the indication of the operation or sequence of operations to be performed. In addition, the host may verify that the, for example, replaceable printer component with which it is interacting is authentic by ensuring that the replaceable printer component verifies the host. Requesting the indication may provide a definite time during which the replaceable printer component is forced to verify the host. The host may determine the replaceable printer component is not authentic if no response to the request is received.

At block 404, the method 400 may include at least pseudorandomly selecting an operation or sequence of operations to be performed. For example, one of several predetermined sequences of operations may be selected at least pseudorandomly, or each operation in the sequence may be selected at least pseudorandomly. In an example, a random or pseudorandom number generator may be instructed to generate a number. The number may be mapped to an operation or sequence of operations that is thereby selected. In some examples, the same operation or sequence of operations may be used every time, or the operation or sequence of operations may be selected in a predetermined order (e.g., a counter may be incremented to select the operation or sequence of operations). In an example, the operation or sequence of operations may be selected in response to receiving the request from the host. Alternatively, or in addition, the operation or sequence of operations may be selected prior to receiving the request.

Block 406 may include indicating to the host the operation or sequence of operations to be performed. The indication may be transmitted to the host via a wired or wireless interface. Each operation may be indicated, or the indication may include an address for a lookup table containing the operation or sequence of operations to be performed. In an example, the operation or sequence of operations may be indicated in response to receiving the request from the host for the operation or sequence of operations to be performed.

Block 408 may include measuring a physical property affected by an operation performed by a host. For example, an electrical property, motion, vibration, temperature, or the like may be measured using an appropriate sensor. In some examples, measuring the physical property may include taking a baseline operation while the host is not performing the operation and a measurement while the host is expected to be performing the operation. At block 410, the method 400 may include determining the host did not perform the operation. In some examples, the measurement while the host is expected to be performing the operation may be indirectly compared to a plurality of thresholds to determine that the host did not perform the operation. For example, a ratio of the measurement during expected operation to the baseline measurement may be computed. Determining the host did not perform the operation may include determining the ratio outside a range of acceptable values.

Block 412 may include storing an indication the host did not perform the operation in response to determining the host did not perform the operation. The stored indication may disable access to a feature. In some examples, storing the indication may include storing a single value indicative of whether the host performed the operation. In some examples, storing the indication may include storing indications of which features to make available, and the stored indications may not permit access to all features. At block 414, the method 400 may include receiving a proper request to access the feature from the host. The request may be proper in that access would be provided if the host had performed the operation.

At block 416, the method 400 may include deciding, based on the stored indication, not to provide access to the feature in response to the proper request. Since the host did not perform the operation, it may not be permitted to access the feature. Accordingly, the host may not be provided access despite the request being otherwise proper. The stored indication may be used to determine whether the host performed the operation or which features are available to the host. In an example, the communication engine 210 of FIG. 2 may perform blocks 402, 406, or 414, the operation selection engine 212 may perform block 404, the sensor engine 220 may perform block 408, the verification engine 230 may perform block 410, and the feature engine 240 may perform blocks 412 or 416.

Figure 5:
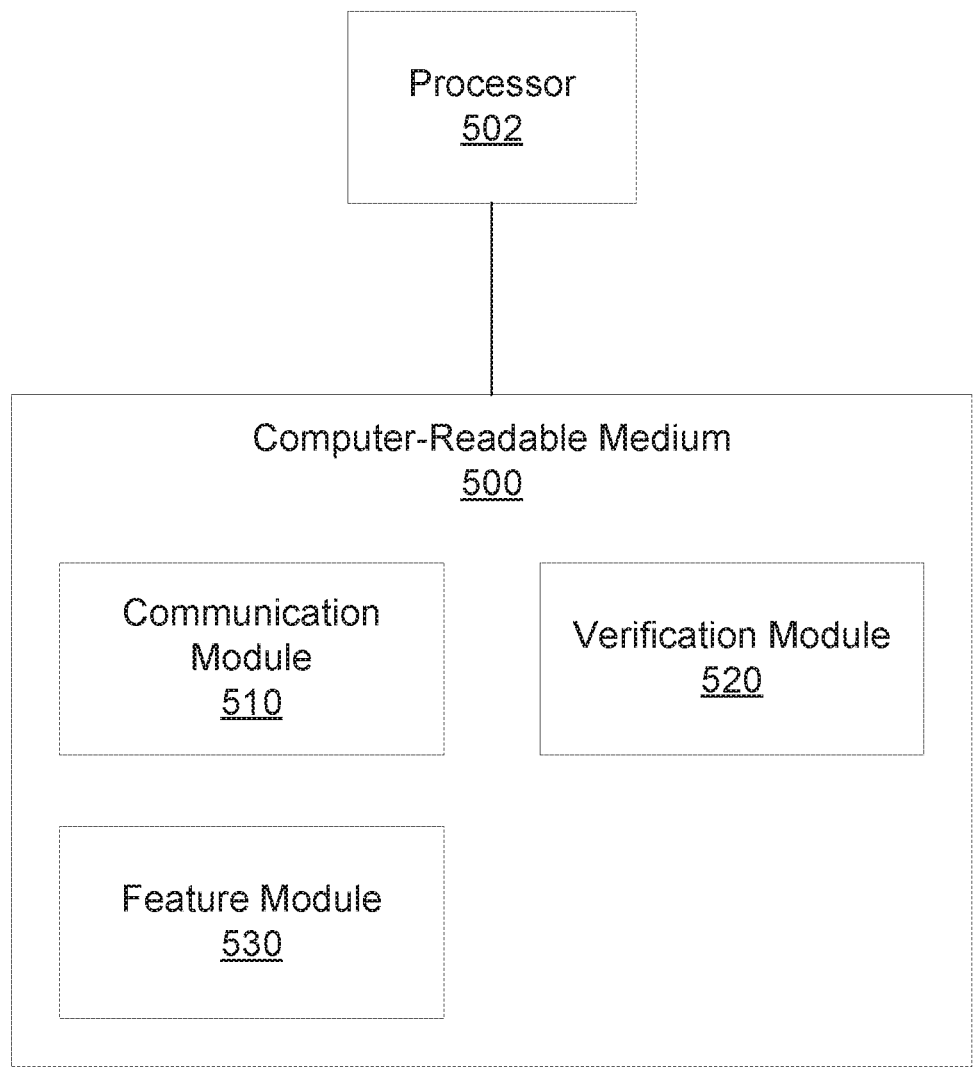
FIG. 5 is a block diagram of an example computer-readable medium including instructions that cause a processor to verify authenticity of a host.

FIG. 5 is a block diagram of an example computer-readable medium 500 including instructions that, when executed by a processor 502, cause the processor 502 to verify authenticity of a host. The computer-readable medium 500 may be a non-transitory computer readable medium, such as a volatile computer readable medium (e.g., volatile RAM, a processor cache, a processor register, etc.), a non-volatile computer readable medium (e.g., a magnetic storage device, an optical storage device, a paper storage device, flash memory, read-only memory, non-volatile RAM, etc.), and/or the like. The processor 502 may be a general purpose processor or special purpose logic, such as a microprocessor, a digital signal processor, a microcontroller, an ASIC, an FPGA, a programmable array logic (PAL), a programmable logic array (PLA), a programmable logic device (PLD), etc.

The computer-readable medium 500 may include a communication module 510. As used herein, a "module" (in some examples referred to as a "software module") is a set of instructions that when executed or interpreted by a processor or stored at a processor-readable medium realizes a component or performs a method. The communication module 510 may include instruction that, when executed, cause the processor 502 to indicate to a host an operation to be performed by the host. For example, the communication module 510 may cause the processor 502 to transmit or instruct an interface to transmit an indication of the operation to be performed over a wired or wireless interface.

The computer-readable medium 500 may also include a verification module 520. The verification module 520 may cause the processor 502 to determine whether the host performed the operation based on a measurement of a property affected by the operation. The verification module 520 may cause the processor 502 to retrieve the measurement from a sensor, from a computer-readable medium (e.g., the computer-readable medium 500) where the measurement was previously stored, or the like. The verification module 520 may cause the processor 502 to compare the measurement to predetermined values associated with performance of the operation. Based on the comparison, the verification module 520 may cause the processor 502 to determine whether the measurement is indicative of the host performing the operation.

The computer-readable medium 500 may also include a feature module 530. The feature module 530 may cause the processor 502 to disable access to a feature based on a determination the host did not perform the operation. For example, the host may attempt to use a feature, and the feature module 530 may cause the processor 502 to not allow usage of the feature due to a previous determination the host did not perform the operation. Alternatively, or in addition, the feature module 530 may cause the processor 502 to indicate available features to the host and to omit particular features from the features indicated as being available based on the determination the host did not perform the operation. In an example, when executed by the processor 502, the communication module 510 may realize the communication engine 210 of FIG. 2, the verification module 520 may realize the verification engine 230, and the feature module 530 may realize the feature engine 240.

Figure 6:
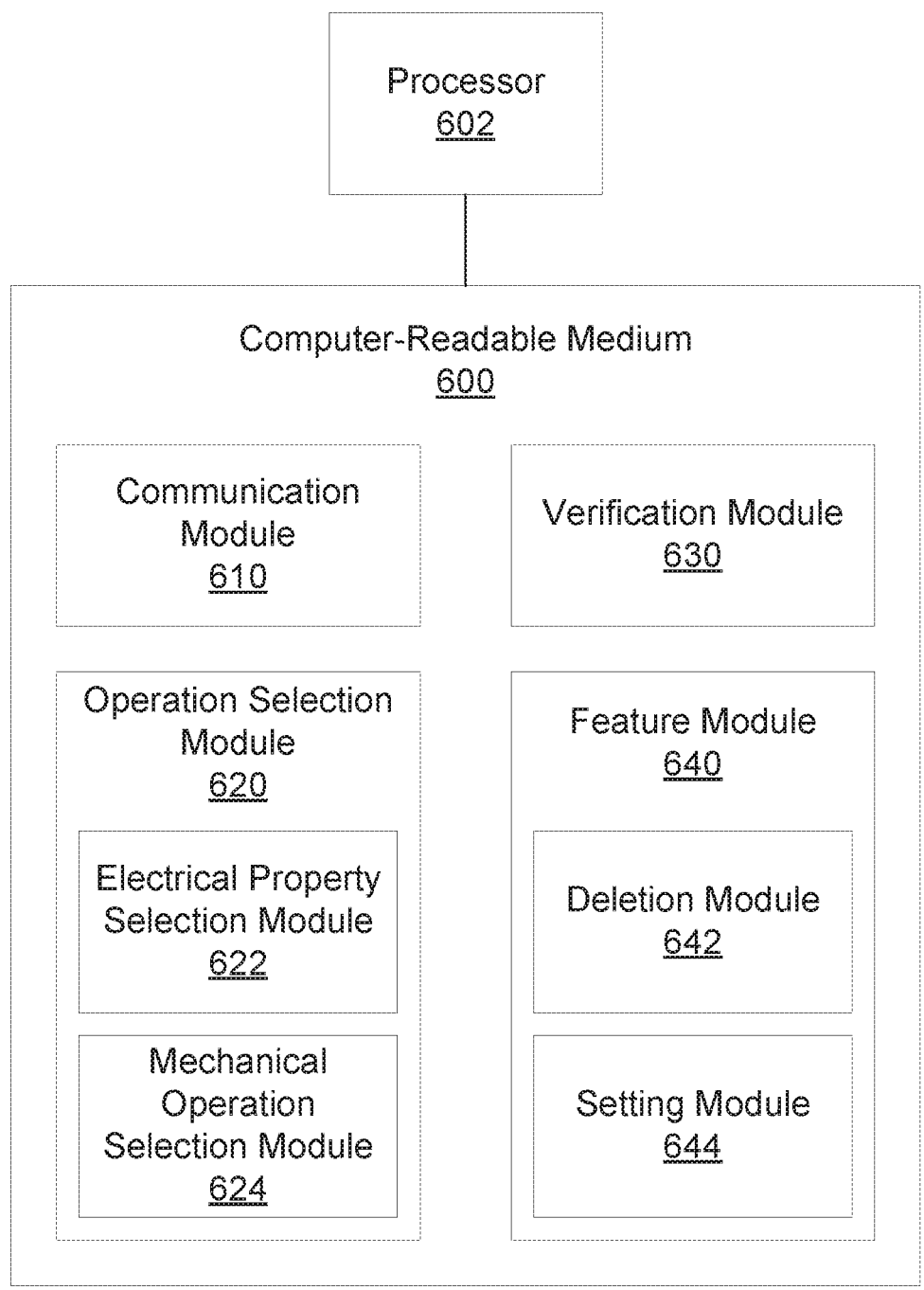
FIG. 6 is a block diagram of another example computer-readable medium including instructions that cause a processor to verify authenticity of a host.

FIG. 6 is a block diagram of another example computer-readable medium 600 including instructions that, when executed by a processor 602, cause the processor 602 to verify authenticity of a host. The computer-readable medium 600 may include a communication module 610. The communication module 610, when executed by the processor 602, may cause the processor 602 to indicate to a host an operation to be performed by the host. In an example, a replaceable printer component may include the computer-readable medium 600 and the processor 602. The replaceable printer component may be communicatively coupled to the host by insertion of the replaceable printer component into the host, which may create a wired or wireless connection between the replaceable printer component and the host. The communication module 610 may cause the processor 602 to indicate the operation to be performed by transmitting the indication or causing a communication interface to transmit the indication using the wired or wireless connection.

In some examples, the computer-readable medium 600 may include an operation selection module 620. The operation selection module 620 may cause the processor 602 to select the operation to be performed by the host. For example, the operation selection module 620 may cause the processor 602 to select the operation pseudorandomly or randomly. In some examples, the operation selection module 620 may cause the processor 602 to select a sequence of operations to be performed by the host.

The operation selection module 620 may include an electrical property selection module 622. The electrical property selection module 622 may cause the processor 602 to select an electrical property to be modified as the operation performed by the host. The electrical property selection module 622 may also, or instead, cause the processor 602 to select an amount to modify the electrical property. The electrical property may be a voltage, a frequency, a current, a resistance, an impedance, or the like. The electrical property may be a property of an electrical signal transmitted from the host, such as an electrical signal associated with the wired connection between the host and the replaceable printer component (e.g., a voltage supply level associated with the wired connection, voltage levels used to represent values in digital communication, a frequency of a clock used in communications, etc.). The communication module 610 may cause the processor 602 to indicate to the host to change the electrical property, for example, by indicating to the host to change the electrical property of the electrical signal transmitted from the host.

The operation selection module 620 may include a mechanical operation selection module 624. The mechanical operation selection module 624 may cause the processor 602 to select an operation of a mechanical part as the operation performed by the host. The mechanical operation selection module 624 may also, or instead, cause the processor 602 to select a speed, power, temperature, etc. at which to operate the mechanical part. The mechanical part may be a fan, a fuser, a drum, a roller, a belt, a scanner, or the like. Operation of the mechanical part may be detected by measuring a motion, vibration, temperature change, or the like caused by operation of the mechanical part. The communication module 610 may cause the processor 602 to indicate to the host to operate the mechanical part.

The computer-readable medium 600 may include a verification module 630. The verification module 630 may cause the processor 602 to determine whether the host performed the operation based on a measurement of a property affected by the operation. For example, the processor 602 may be communicatively coupled with a sensor able to measure the property, may be able to retrieve stored measurements from a memory where the sensor stores measurements, or the like. The verification module 630 may cause the processor 602 to compare the measurements to expected values based on the operation the host was instructed to perform. For example, the verification module 630 may cause the processor 602 to compare the measurements to predetermined upper or lower thresholds for the measurements. A measurement outside the thresholds may indicate that the operation was not performed. In some examples, the verification module 630 may cause the processor 602 to compute a ratio between a measurement performed while the operation should have occurred and a baseline measurement when no operation should have occurred. The verification module 630 may cause the processor 602 to compare the ratio to the thresholds.

The computer-readable medium 600 may include a feature module 640. The feature module 640 may cause the processor 602 to disable access to a feature based on a determination that the host did not perform the operation. For example, the feature module 640 may cause the processor 602 to store an indication that the host did not perform the operation or indications of the accessible or not accessible features, for example, in the computer-readable medium 600. When a request from the host to access a feature is received, the feature module 640 may cause the processor 602 to retrieve the stored indication to determine whether or not to allow access to the feature.

The feature module 640 may include a deletion module 642. The deletion module 642 may cause the processor 602 to delete security data to prevent access to the security data, e.g., based on a determination that the host did not perform the operation. For example, the computer-readable medium 600 or another computer-readable medium (e.g., a secure computer-readable medium) may store security data. The security data may be usable to authenticate the replaceable printer component, to provide for encrypted communication, or the like. The deletion module 642 may cause the processor 602 to indicate to the computer-readable medium storing the security data to erase the portion of the computer-readable medium containing the security data.

The feature module 640 may include a setting module 644. The setting module 644 may cause the processor 602 to reduce a number or range of values available for a print setting, e.g., based on a determination that the host did not perform the operation. For example, some settings may cause the host or the replaceable printer component to operate at a high speed, power, temperature, or the like that could potentially damage the host or the replaceable printer component. The setting module 644 may cause the processor 602 to disable access to a print setting that may potentially cause damage. For example, the setting module 644 may cause the processor 602 to disable a highest value, disable all but a lowest value, disable a predetermined number values, disable values greater than a predetermined percentage of a highest value, or the like for the setting. The setting module 644 may cause the processor 602 to store indications of enabled or disabled values for a print setting (e.g., each print setting limited based on the determination the host did not perform the operation). In an example, when executed by the processor 602, the communication module 610 may realize the communication engine 210 of FIG. 2, the operation selection module 620 may realize the operation selection engine 212, the verification module 630 may realize the verification engine 230, and the feature module 640 may realize the feature engine 240.

The above description is illustrative of various principles and implementations of the present disclosure. Numerous variations and modifications to the examples described herein are envisioned. Accordingly, the scope of the present application should be determined only by the following claims.

What is claimed is:

1. A replaceable printer component comprising:
   a communication engine to transmit a request signal to a host based on the replaceable printer component being installed in the host, the request signal indicating an operation to be performed by the host;
   a sensor engine to receive a response signal from the host and to measure a property of the response signal affected by the operation;
   a verification engine to determine whether the host performed the operation based on the measurement of the property of the response signal; and
   a feature engine to disable access to a feature based on a determination that the host did not perform the operation.

2. The replaceable printer component of claim 1, wherein the sensor engine is to measure a property of the response signal selected from the group consisting of an electrical property, a motion property, a vibration property, and a temperature property.

3. The replaceable printer component of claim 1, wherein the feature engine is to determine a feature to make available based on whether the host performed the operation.

4. The replaceable printer component of claim 3, further comprising a memory to store a key, wherein the feature engine is to disable encrypted communication based on the determination that the host did not perform the operation.

5. The replaceable printer component of claim 1, further comprising an operation selection engine to select a first plurality of operations including the operation,
   wherein the host is to select a second plurality of operations and perform the first and second pluralities of operations, the verification engine is to determine the second plurality of operations based on measurements by the sensor engine, and the communication engine is to indicate the second plurality of operations to the host.

6. The replaceable printer component of claim 1, wherein the request signal indicating the operation to be performed by the host includes an index or an address of a lookup table containing predetermined operations.

7. The replaceable printer component of claim 1, wherein the request signal indicating the operation to be performed by the host includes an indication of a plurality of operations to be performed, an indication of a time for each of the plurality of operations to be performed, and an indication of a delay between each of the plurality of operations to be performed.

8. The replaceable printer component of claim 1, wherein the communication engine is to receive a request from the host to transmit the request signal indicating the operation to be performed by the host.

9. The replaceable printer component of claim 1, wherein the request signal indicating the operation to be performed by the host includes a magnitude of a modification of the operation to be performed by the host.

10. A method, comprising:
    installing a replaceable printer component in a host;
    transmitting a request signal to the host based on the replaceable printer component being installed in the host, the request signal indicating an operation to be performed by the host;
    receiving a response signal from the host and measuring a physical property of the response signal affected by the operation performed by the host;
    determining the host did not perform the operation based on the measurement of the physical property; and
    disabling access to a feature based on determining the host did not perform the operation.

11. The method of claim 10, further comprising receiving a request from the host for an indication of the operation to be performed.

12. The method of claim 11, further comprising at least pseudorandomly selecting the operation to be performed, and indicating to the host the operation to be performed.

13. The method of claim 12, wherein at least pseudorandomly selecting the operation to be performed comprises at least pseudorandomly selecting a sequence of operations to be performed.

14. The method of claim 10, wherein disabling access comprises storing an indication the host did not perform the operation, receiving a proper request to access the feature, and deciding based on the stored indication not to provide access to the feature in response to the proper request.

15. A non-transitory computer-readable medium comprising instructions that, when executed by a processor, cause the processor to:
    transmit a request signal to a host based on a replaceable printer component being installed in the host, the request signal indicating an operation to be performed by the host;
    receive a response signal from the host and measure a property of the response signal affected by the operation;
    determine whether the host performed the operation based on the measurement of the property affected by the operation; and
    based on a determination the host did not perform the operation, disable access to a feature.

16. The non-transitory computer-readable medium of claim 15, wherein the instructions to transmit the request signal indicating to the host the operation to be performed include instructions that cause the processor to transmit the request signal to the host indicating to change a property of an electrical signal transmitted from the host.

17. The non-transitory computer-readable medium of claim 15, wherein the instructions to transmit the request signal indicating to the host the operation to be performed include instructions that cause the processor to transmit the request signal to the host indicating to operate a mechanical part, wherein the measurement of the property includes a measurement of motion, vibration, or temperature change caused by the operation of the mechanical part.

18. The non-transitory computer-readable medium of claim 15, wherein the instructions to disable access include instructions to cause the processor to delete security data to prevent access to the security data.

19. The non-transitory computer-readable medium of claim 15, wherein the instructions to disable access include instructions to cause the processor to reduce a number or range of values available for a print setting.

\* \* \* \* \*